United States Patent [19]
Tamai et al.

[11] Patent Number: 5,113,957
[45] Date of Patent: May 19, 1992

[54] LIFTING CONTROL DEVICE FOR AN AGRICULTURAL MACHINE

[75] Inventors: Seishin Tamai; Yoshinori Doi; Masakatsu Araki, all of Matsuyama, Japan

[73] Assignee: Isekinoki Kabushiki Kaisha Gijutsubu, Ehime, Japan

[21] Appl. No.: 237,791

[22] Filed: Jun. 23, 1989

[30] Foreign Application Priority Data

Oct. 30, 1986 [JP] Japan .................. 61-259427

[51] Int. Cl.⁵ .................................. A01B 63/112
[52] U.S. Cl. ............................... 172/10; 172/7
[58] Field of Search ............. 172/7, 8, 10, 2, 239

[56] References Cited

U.S. PATENT DOCUMENTS

| | | | |
|---|---|---|---|
| 4,132,273 | 1/1979 | Mortonson et al. | 172/7 X |
| 4,300,638 | 11/1981 | Katayama et al. | 172/7 X |
| 4,495,577 | 1/1985 | Strunk et al. | 172/7 X |
| 4,571,500 | 2/1986 | Mucheyer | 172/7 X |

FOREIGN PATENT DOCUMENTS 0003077 7/1979 European Pat. Off.
908426 2/1954 Fed. Rep. of Germany.
2515474 5/1983 France.
272999 1/1951 Switzerland.

*Primary Examiner*—Dennis L. Taylor
*Assistant Examiner*—Jeffrey L. Thompson
*Attorney, Agent, or Firm*—Armstrong, Nikaido, Marmelstein, Kubovcik & Murray

[57] ABSTRACT

A control device controls the draft for moving the working machine, such as a plow, up or down. The working machine is mounted on a tractor by way of a hydraulic lifting device which is adjusted to the tilling depth predetermined by a tilling depth setter which depends on the increase or decrease of traction resistance detected by a draft sensor. When the lifting machine is changed from the ascending position to the descending position, the draft control function is stopped for a specified short time or a specified short distance to lower the working machine quickly. However, the quick lowering of the working machine is inhibited when the relationship between the detected value by the draft sensor and the preset value by the tilling depth setter is not at the descending position of the working machine.

1 Claim, 5 Drawing Sheets

LIFTING CONTROL DEVICE FOR AN AGRICULTURAL MACHINE

FIELD OF THE INVENTION

This invention relates to a lifting control device for an agricultural tilling machine having a working machine, such as a plow, mounted on a tractor.

BACKGROUND OF THE INVENTION

An agricultural machine, used for tilling by linking a plow to a tractor which has a hydraulic device for lifting and lowering the working machine through a link mechanism, generally possesses (a) a draft control function for moving the plow up or down depending on an increase or decrease of traction resistance, and (b) a tilling depth setter for setting the tilling depth in a specified range. The draft control is intended to detect the load applied to the link by a draft sensor provided on the top of a link mechanism. The plow is lifted or lowered by the hydraulic device to keep this detected value within a preset range determined by the tilling depth setter, thereby adjusting the tilling depth.

When lowering the plow, it is effective to perform a so-called plowing-in control, that is, to fully open the hydraulic valve to suddenly lower the working machine, in order to bite into the soil favorably. However, when the tilling depth setting from the tilling depth setter is shallow, the plow was lifted above the farm field, depending on the type of plow, when the draft operation was started after the plowing-in control. In this case, if the plow was lifted above the ground, the operator often continued work without noticing this state.

SUMMARY OF THE INVENTION

To solve the above-discussed problems, this invention is composed as follows:

This invention presents a lifting control device for an agriculture machine on which a plow or other working machine is mounted on a tractor by way of a hydraulic lifting device. The lifting control device controls the draft for moving the working machine up or down to adjust the working machine to a tilling depth which is predetermined by a tilling depth setter depending on the increase or decrease of traction resistance detected by a draft sensor. The lifting control device has a plowing-in control function for suddenly lowering the working machine by stopping the draft control function for a specified short time when the working machine lifting device is changed from the raised position of the working machine to a lowered position of the working machine. The lifting control device is designed to temporarily stop the plowing-in control function when the relationship between the detected value by the draft sensor and the preset value by the tilling depth setter does not indicate being in the lowering mode of the working machine.

As clear from the description herein, the lifting control device of the agricultural machine of this invention is designed to compare the draft sensor value and the set value when lowering the working machine from the raised position to the working position, and to inhibit the plowing-in control, for quickly lowering the working machine, by fully opening the lowering valve when a command to lower the working machine is not issued. Thus, it is possible to prevent travelling while the working machine is lifted above the ground after having been initially lowered.

DETAILED DESCRIPTION OF THE PREFERRED EMBODIMENT

Figure 1:
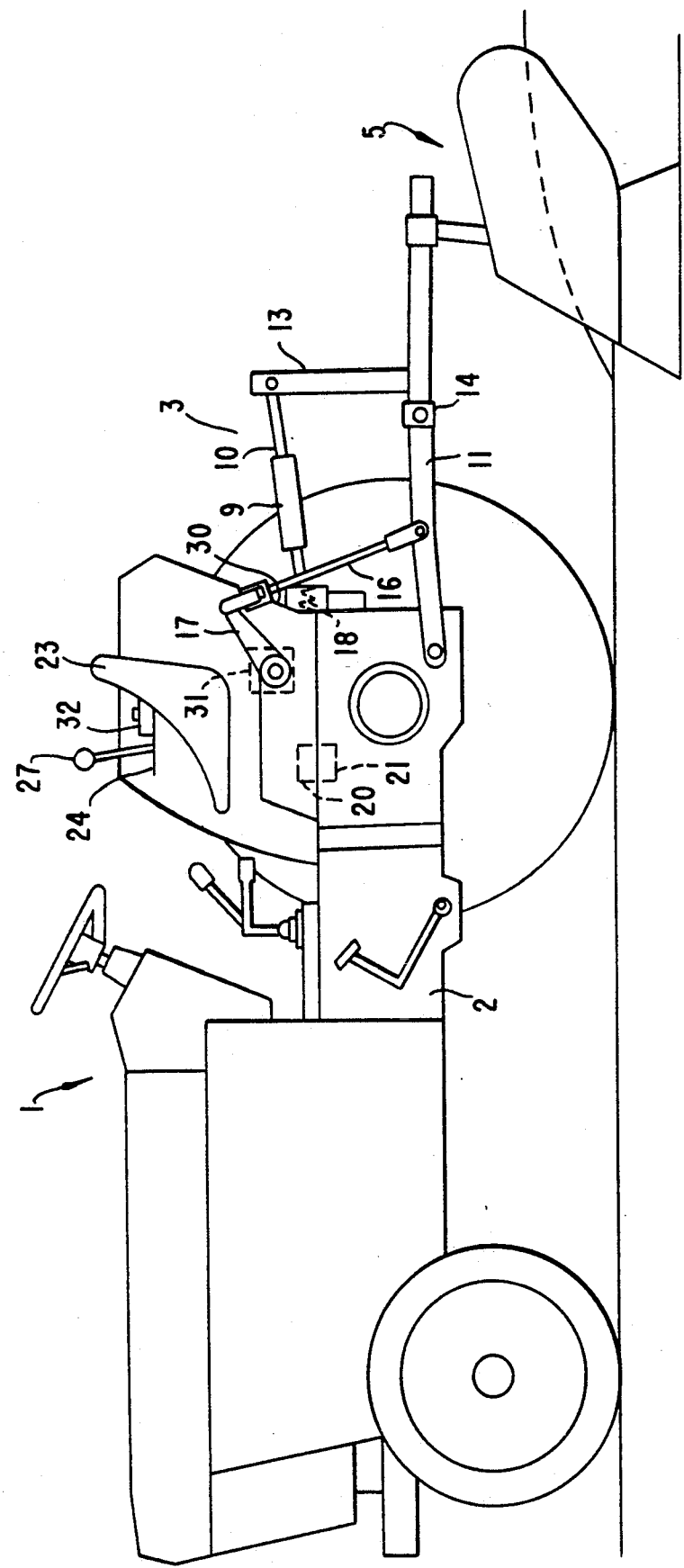
FIG. 1 is a side view of an example of a tilling agricultural machine relating to this invention.
Figure 2:
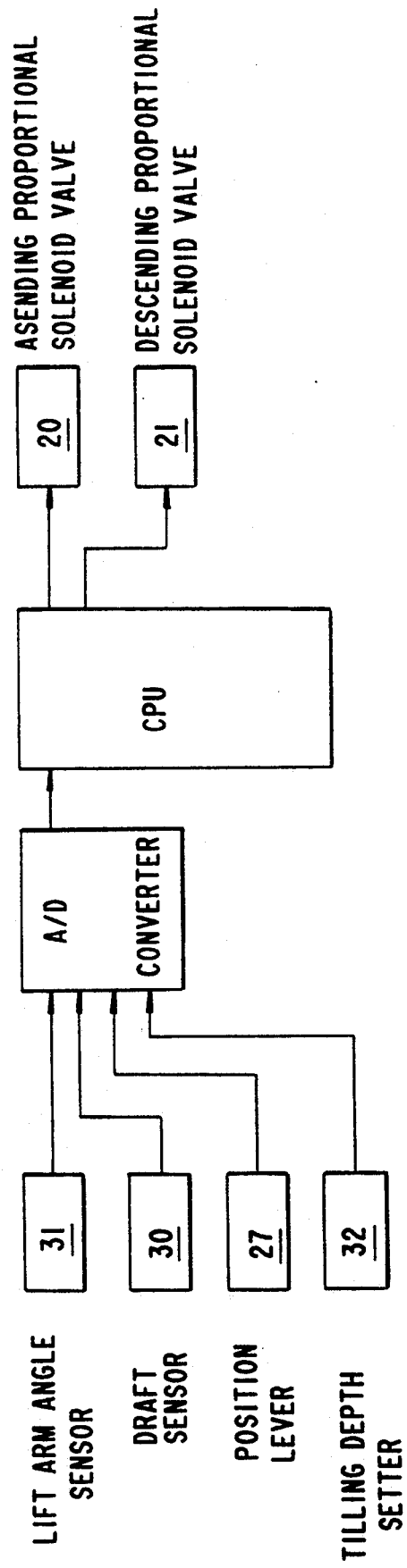
FIG. 2 and FIG. 6 are block diagrams showing the control mechanism of hydraulic equipment.

Referring now to the drawings, one of the embodiments of this invention is described below.

FIG. 1 refers to an embodiment of an agricultural machine relating to this invention, in which this agricultural machine 1 has a link mechanism 3 disposed in the rear part of tractor 2, and a plow 5 is mounted on this link mechanism 3 as a working machine.

The link mechanism 3 has one top link 10 possessing a turnbuckle for expansion and contraction (or a hydraulic cylinder) 9, and a pair of right and left lower links 11, 11. The top link 10 is attached to a mast 13 of the plow 5, and the lower links 11, 11 to the right and left sides of a horizontal frame 14 of the plow 5. The lower links 11, 11 are suspended on a hydraulic lift arm 17 of the tractor 2 by lift rods 16, 16 linked to the middle thereof. At the base part of the top link 10, a balancing spring 18 is fitted. The top link 10 is supported, when being pulled, to the tractor body by this spring 18. The tension of the balancing spring 18 may be properly selected depending on the type of plow to be mounted.

The tractor 2 is furnished with an electric-hydraulic type of hydraulic device capable of controlling the flow rate of the working fluid by a pair of proportional solenoid valves 20, 21 for lifting and lowering the plow. Using the oil pressure of this hydraulic device, various hydraulic cylinders are expanded and contracted, while the lift arm 17 is turned up and down. A position lever 27 is disposed on an operation console 24 at the side of a driver's seat 23. When the position lever 27 is placed in the UP position, the solenoid valve 20 for lifting the plow is actuated to turn the lifting arm 17 upward. When the same lever is placed in the DOWN position, the solenoid valve 21 for lowering the plow is actuated to turn the lift arm 17 downward. The agricultural machine 1 has an up/down switch 28 (FIG. 6) as a means of lifting the plow, and by using this switch the link mechanism 3 is moved up and down to a specified position.

Figure 3:
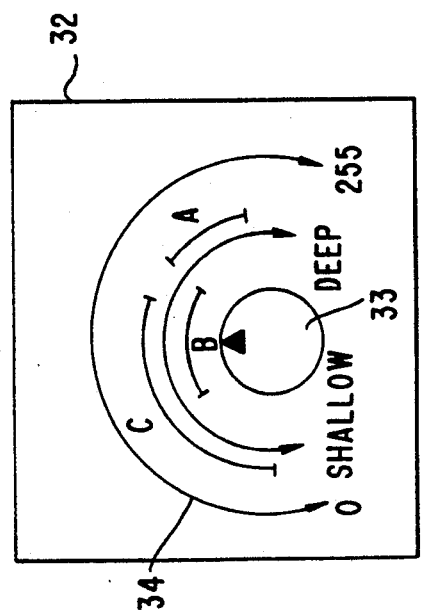
FIG. 3 is an explanatory chart of the tilling depth setter.

As a detecting device for controlling the traction force and tilling depth of the plow by the tractor, a draft sensor 30 detects the load applied to the link. The draft sensor 30 is disposed on the top link 10. A lift arm angle sensor 31, for detecting the turning angle of the lift arm, is provided at the base part of the lift arm 17. A tilling depth setter 32, as a device for setting the tilling depth, is provided in the operation console 24. The tilling depth setter 32 is a dial type of device as shown in FIG. 3. Graduations 34 from 0 to 225 and ranges A, B, C, to show the working range for each plow are marked around the dial 33 of the tilling depth setter 32. For example, range A is for a heavy weight triple reversible plow, range B is for a medium weight dual plow, and range C is for a light weight single plow.

Figure 4:
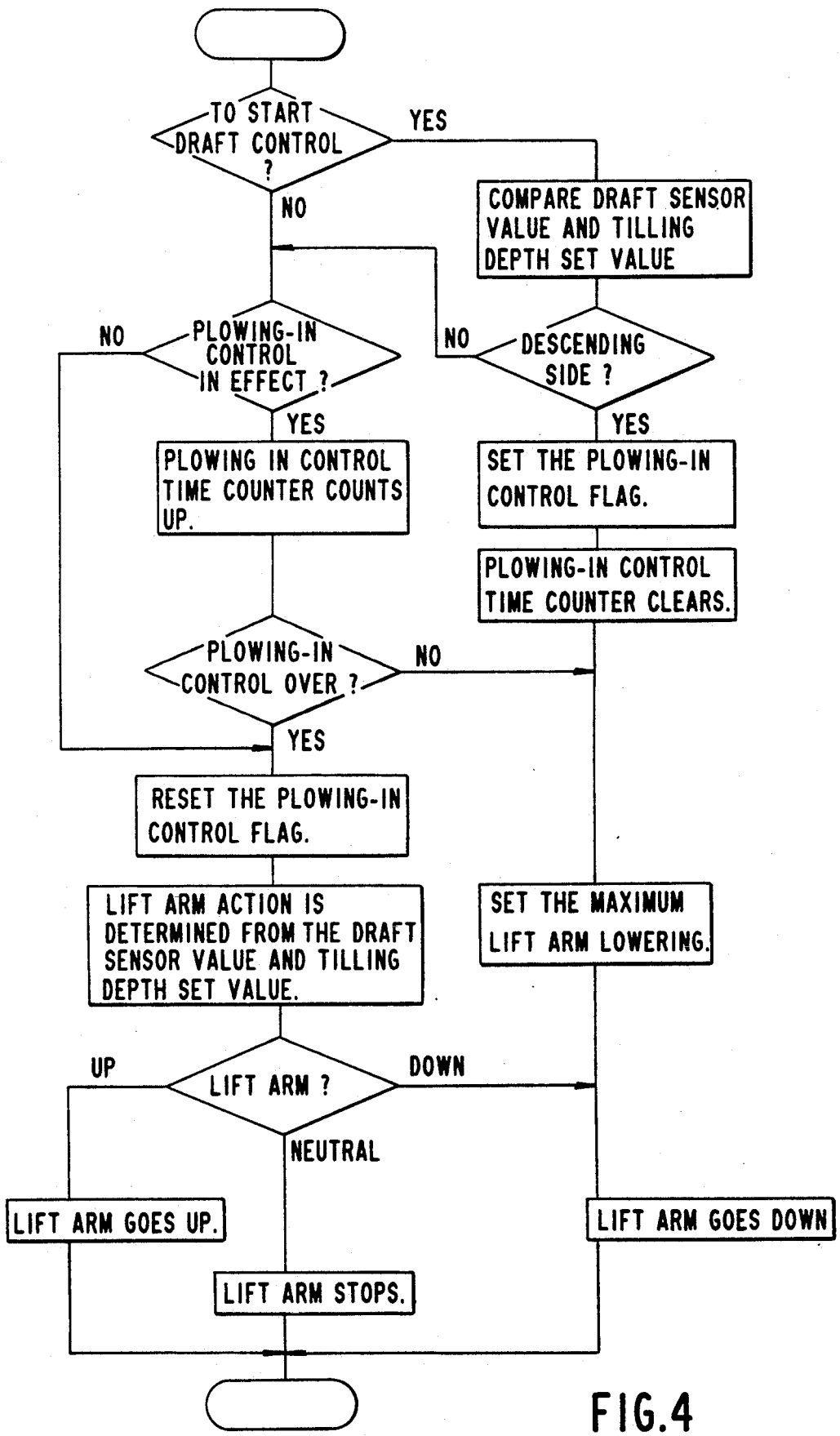
FIG. 4 and FIG. 5 are flow charts showing the control action.

When working, the draft control is in effect, and the valves 20, 21 of the hydraulic device are properly changed over so that the detected value of the draft sensor 30 may be equal to the value preset by the dial 33 of the tilling depth setter, and the plow 5 is lifted or lowered. When lowering the plow 5 from the raised position to the working position, plowing-in control is in effect. The draft control is temporarily stopped for a specified time (usually 2 to 3 seconds), and the plow is lowered while the valve 21 for lowering is in a fully open state. In this way, by setting the lowering speed of the plow 5 to a high value, the impact when the plow lands on the ground becomes larger, and it is possible to sink the plow blade securely to the desired depth in a short time. The lifting control device is designed so that the plowing-in control is ineffective while the relationship of the detected value of the draft sensor 30 and the tilling depth set value is not in the "lowering" mode. FIG. 4 is a flow chart of the plowing-in control. Since the plowing-in control is inhibited thus depending on the relationship between the detected value of the draft sensor 30 and the tilling depth set value, it is possible to prevent the error of lifting up the working machine after the plowing-in control even if the tilling depth is set very shallow.

Figure 5:
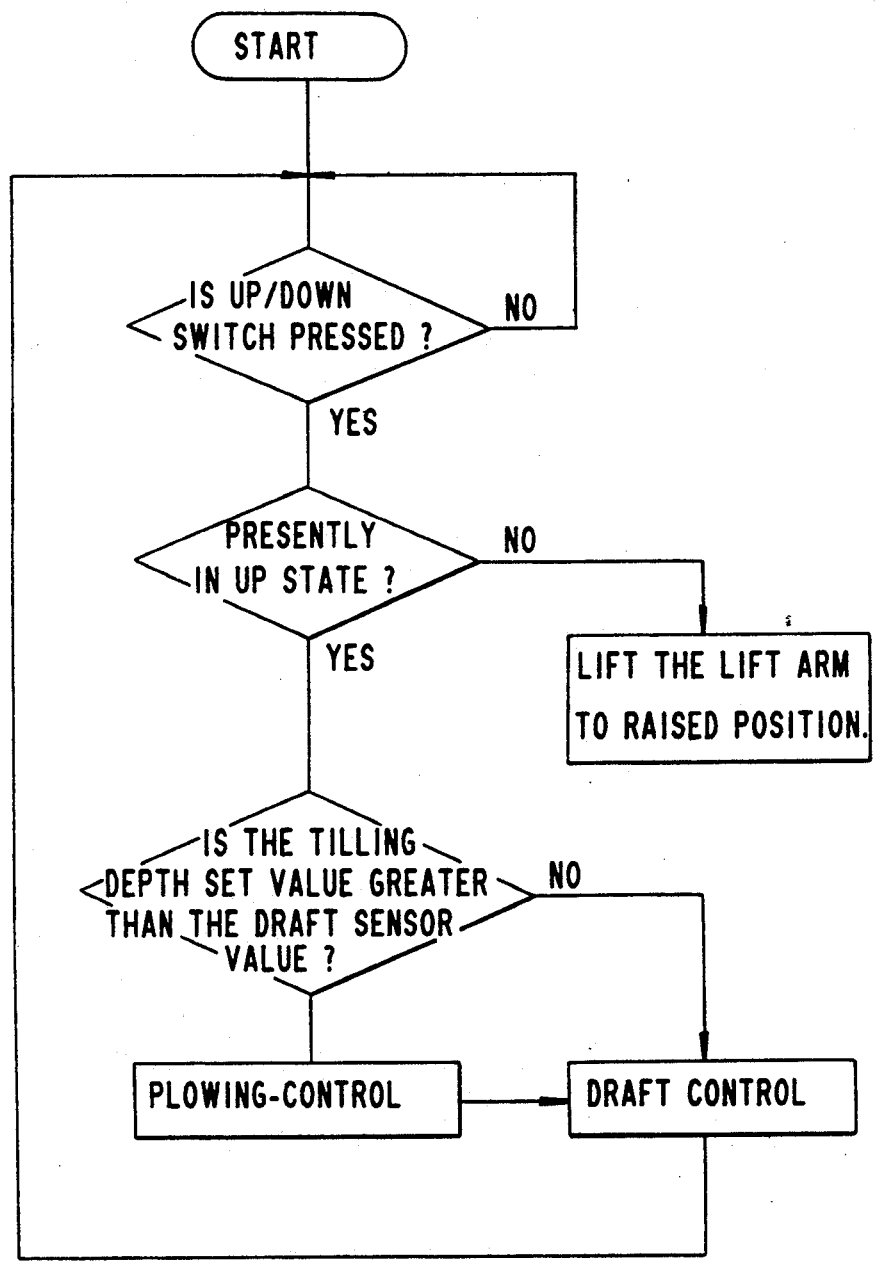

When lowering the plow 5 to the working position by an up/down switch 28, as shown in FIG. 5, if the indication of the dial 33 of the tilling depth setter 32 is away from the working region, the lift control device is also effective so that the plow 5 may not be lowered. In this case, when the dial 33 is set again in the working region, the plow 5 is allowed to go down.

In this setting, when it is desired to lower the plow to the working region by using the up/down switch 28, if the setting of the tilling depth by the tilling depth setter is not proper, the plow is designed not to descend, which makes it possible to prevent the error of continuing to run the agricultural machine while the operator is not aware that the once lowered plow is lifted above the ground and is not tilling.

Figure 6:
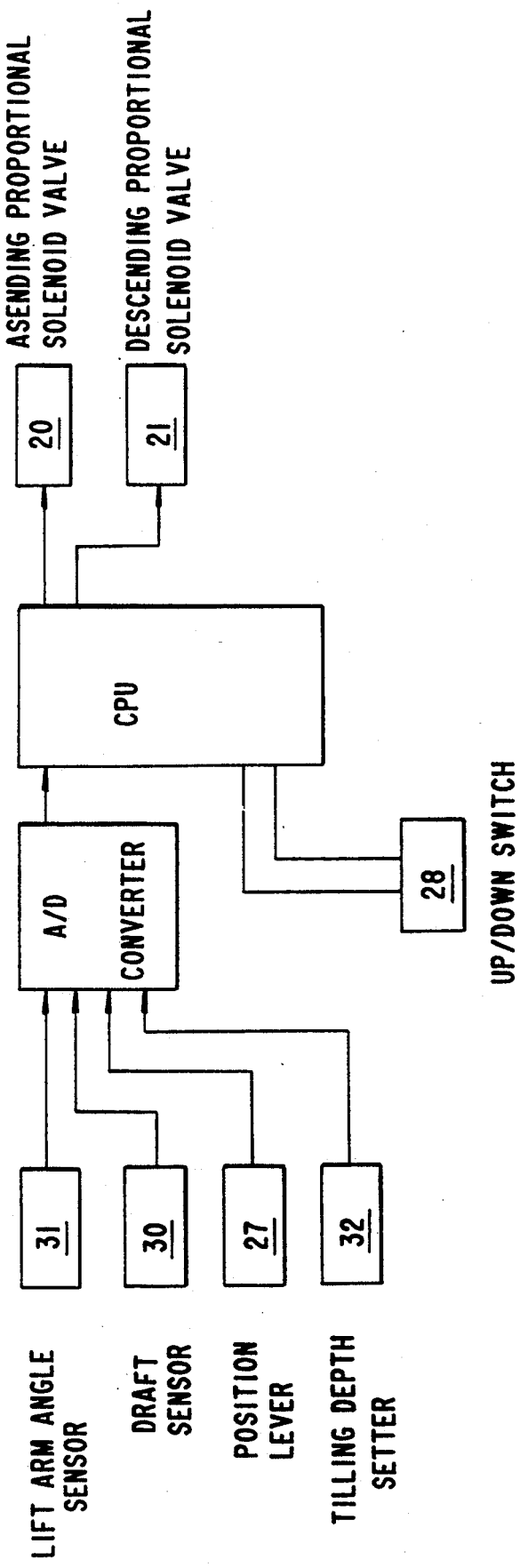

Furthermore, as shown in FIG. 6, by controlling the proportional solenoid valve by the CPU by means of position lever 27, lift arm angle sensor 31, tilling depth setter 32, and tilling depth sensor 40 for detecting the tilling depth, the lift control device is also effective to prevent an error due to lifting of the working machine above the ground so that the down function of the up/down switch 28 may be ineffective when the setting of the tilling depth setter is smaller than the shallowest set position of the tilling depth sensor 40.

We claim:

1. A lifting control device for an agricultural machine mounted on a tractor using a hydraulic lifting device, said lifting control device comprising:
   a draft sensor for detecting traction resistance;
   a tilling depth setter for setting a predetermined tilling depth depending upon said traction resistance detected by said draft sensor; and
   a control means (1) for controlling said traction resistance of said agricultural machine by adjusting said predetermined tilling depth (2) for stopping control of said traction resistance for a predetermined time or a predetermined distance when said hydraulic lifting device is changed from a raised position to a lowered position and (3) for temporarily stopping a plowing-in functoin, which quickly lowers the agricultural machine, when a relationship between (a) said predetermined tilling depth of said tilling depth setter and (b) a detection value of said draft sensor do not indicate said agricultural machine is being lowered.

* * * * *